May 21, 1963 R. N. GUNZELMANN 3,090,502
APPARATUS FOR HANDLING STACKS OF BRICKS
Filed Sept. 18, 1958 9 Sheets-Sheet 1

INVENTOR.
Rudolf N. Gunzelmann
BY
Ezekiel Wolf, Wolf & Greenfield
ATTORNEYS

R. N. GUNZELMANN 3,090,502

APPARATUS FOR HANDLING STACKS OF BRICKS

Filed Sept. 18, 1958

INVENTOR
RUDOLF N. GUNZELMANN
BY Ezekiel Wolf, Wolf + Greenfield

Fig. 6.

May 21, 1963  R. N. GUNZELMANN  3,090,502
APPARATUS FOR HANDLING STACKS OF BRICKS
Filed Sept. 18, 1958  9 Sheets-Sheet 9

FIG. 8

INVENTOR.
Rudolf N. Gunzelmann
BY
Ezekiel Wolf, Wolf + Greenfield
ATTORNEYS

United States Patent Office 3,090,502
Patented May 21, 1963

3,090,502
APPARATUS FOR HANDLING STACKS OF BRICKS
Rudolf N. Gunzelmann, Grobe Vieren 20,
Bremen, Germany
Filed Sept. 18, 1958, Ser. No. 761,908
Claims priority, application Germany Nov. 9, 1957
5 Claims. (Cl. 214—6)

This invention relates to apparatus for use in the production of setting mouldings and is a continuation-in-part of abandoned application Serial No. 472,497, filed on December 1, 1954, of Rudolf N. Gunzelmann, entitled Method of and Apparatus for the Production of Setting Mouldings Particularly Lime Sand.

The invention has primarily for its object to provide certain improvements in such apparatus which result in improved operation whereby the possibility of damage to the bricks during transportation and stacking is reduced to a minimum if not entirely eliminated.

More particularly it is an object of the invention to provide an improved construction of gripper assembly and means for traversing the same between the "take up" position and stacking position which enables the operations of "taking up bricks," "traversing" and depositing for stacking to be carried out smoothly so that the bricks are not subjected to unnecessary loads which could result in damage thereto.

According to a further object, the invention provides a gripper arrangement which includes at least two gripper units each of which has two pairs of individual gripper plates so that the apparatus can be used to handle at least four bricks at a time.

It is a further object of the invention to provide a gripper arrangement having gripper plates all of which are mounted so as to be movable into and out of engagement with the bricks, such gripper plates being preferably capable of an initial movement under gravitational force into contact with the bricks and operable after such initial movement by operating means into positive engagement with the bricks, locking means also being provided to hold individual pairs of gripping plates separated whilst moving towards the position for "taking up" bricks.

A still further object of the invention is to provide a gripper arrangement wherein termination of the downward movement of the grippers results from engagement between stop means and a fixed surface, e.g. the conveyor for green bricks, the mouldings themselves or the surface of the stacking platform.

A still further object of the invention is to provide braking means for terminating the downward movement of the grippers at a predetermined level.

Another object of the invention is to provide means for raising and lowering the gripper arrangement which is operable at different speeds so that the said raising and lowering operations can be effected smoothly without subjecting the green bricks to unnecessary loads.

A still further object of the invention is to provide driving means for traversing the gripper arrangement between the "take up" position and "stacking" position, such driving means being operable at different speeds so that the traversing movement can be effected smoothly without subjecting the green bricks to unnecessary loads during transportation from said one position to the other.

A still further object of the invention is to provide a gripper arrangement wherein individual gripper plates are constituted by a plurality of resilient tongues or alternatively such plates are resiliently mounted, the surfaces of the plates engageable with the bricks being if desired, provided with a covering of for example, sponge rubber or other resilient material.

It is a still further object of the invention to provide a control means, preferably an electrical control means, whereby the complete operation from formation of the mouldings to stacking is carried out automatically and in timed sequence.

In order that the invention may clearly be understood and carried into effect the same will now be described by aid of the accompanying drawings in which.

In the apparatus illustrated production from the press to stacking the mouldings and to driving the stacked mouldings into a hardening tank is effected fully automatically.

Figures 1, 2B:
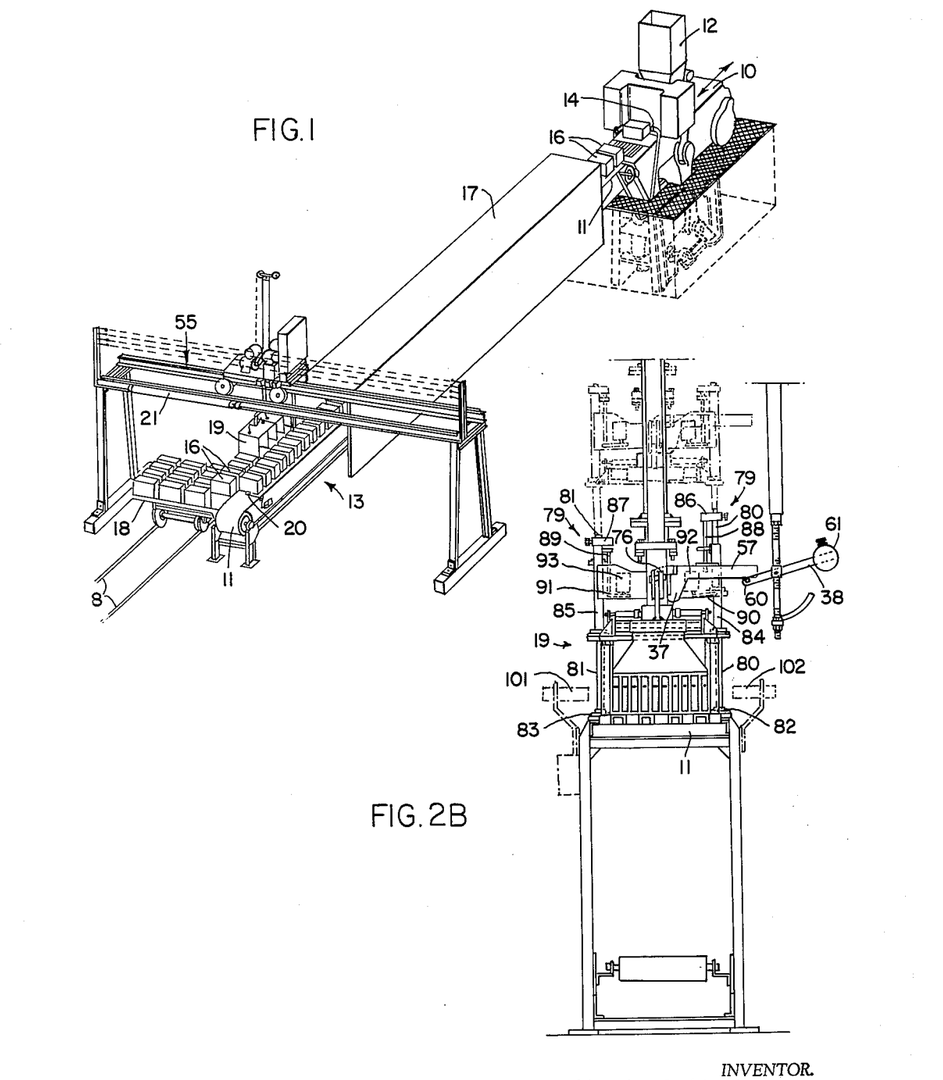
FIGURE 1 is a perspective view showing the layout of the apparatus for the production of bricks sufficiently strong for being moved by the novel conveying apparatus which are moulded on a reciprocating table press.
FIGURES 2A and 2B when placed together with the horizontal chain dot lines coinciding show in end view the complete gripper arrangement and the driving means for traversing the gripper arrangement between the "take up" and stacking position, a loaded truck also being shown in this figure.

The apparatus of FIGURE 1 includes a press 10 having a charging hopper 12 and a mould slider 14, a conveyor 11 extending from the press 10 through a prehardening chamber 17, and a stacking device 13.

The apparatus illustrated is particularly suitable for the production of hollow bricks in the lime sand brick industry, but may be used to advantage for the production of fragile solid bricks as well.

The stacking device is constructed as described hereafter. The essential part of the stacking device is the gripper arrangement denoted generally by reference 19. This gripper arrangement is provided for the simultaneous seizing of four mouldings 16. These four mouldings are, however, not gripped by one pair of gripper plates, but on the contrary, a separate pair of gripper plates is provided for each individual moulding. The gripper plates can be moved vertically relative to their gripping surface.

Figure 4:
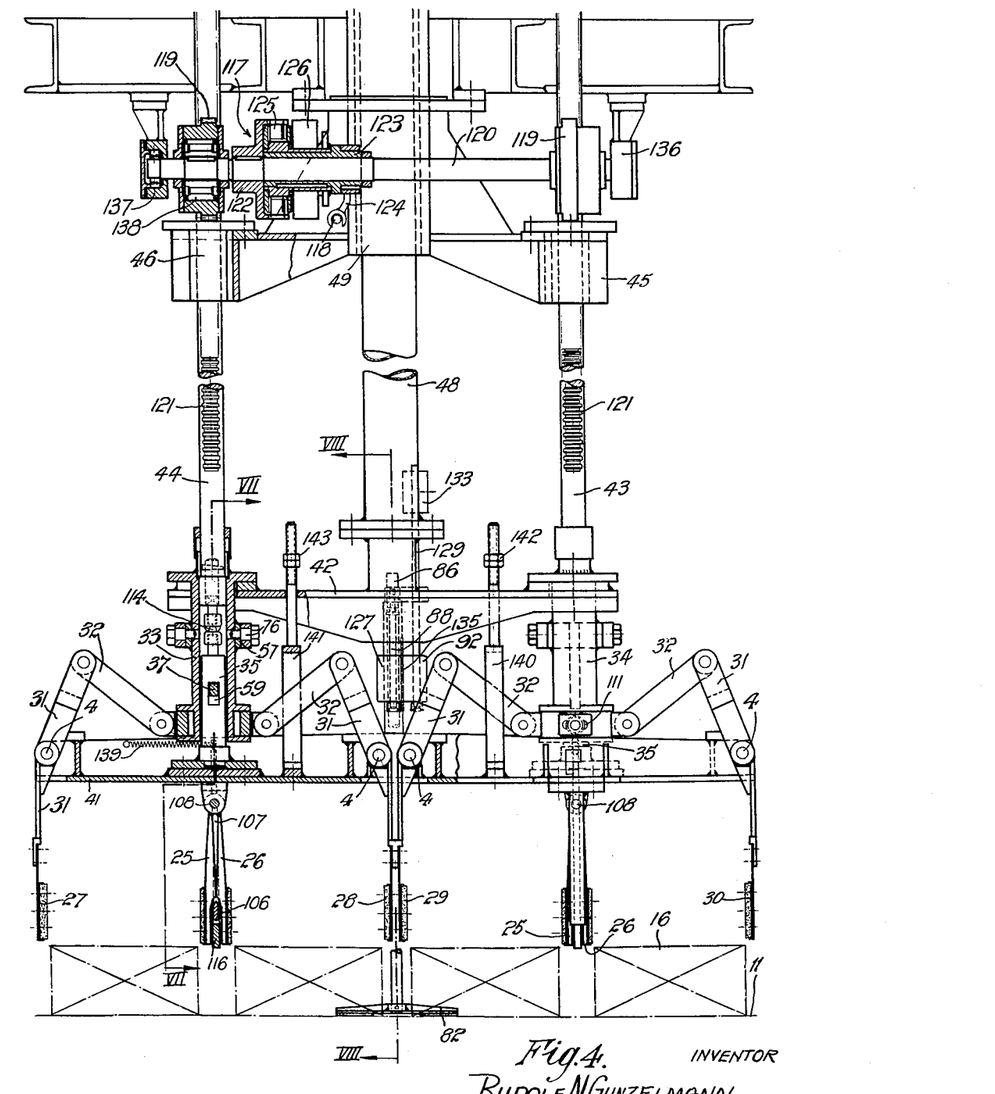
FIGURE 4 shows in elevation and to an enlarged scale a modified form of the gripper arrangement, a portion on the left side of this figure being a section on the line VI—VI of FIGURE 5.

The gripper arrangement shown in the drawings consists of two gripper units each of which incorporates two separate pairs of gripper plates, the said two pairs of plates in each unit being so arranged that a plate from each pair is operable by common operating means into positive gripping engagement with the bricks. Thus as shown in FIGURE 4 the gripper unit at the left of the drawing consists of the separate pairs of gripper plates 25, 27 and 26, 28, respectively. The two plates 25, 26 move initially by gravity into contact with the bricks and are then operable by a common operating means to grip the bricks. Similarly the plates 27, 28 move initially into contact with the bricks and by further common operating means into positive gripping engagement therewith, the said operating means being interconnected so that the grippers operate in synchronism to grip each brick by opposite end faces.

The two gripper plates 25 and 26 are hinged at 108 and slightly spreadable relative to one another by a wedge 106 adapted to engage in a slot 107 formed between said plates as soon as the gripper arrangement commences upward movement, after having been lowered on the conveyor belt 11. The wedge 106 is the middle part of a U-shaped frame which is suspended from the upper yoke 42 by its vertical legs 109. For this purpose the upper end of each leg 109 has a bolt 110, the head of each bolt having a slot 111 in it, in each of which one end of a pin 150 is located. The pins 150 are arranged co-axially with one another the inner end of each pin being fastened to a ring 112 which is positioned within an annular groove 113 of a tube 33 the upper end of which is flanged so as to be supported by the yoke 42. The wedge 106 associated with the right hand gripper unit (FIG. 4) is supported in a manner identical to that just described, the connection to the upper yoke 42 being by tube 34.

By this suspension the wedge 106 is movable vertically for the purpose of a good gripping function. Said four gripper plate assemblies act together with four rows of ten pairs of movable gripper plates 27, 28, 29 and 30. As shown each gripper plate is constituted by a plurality of resilient tongues of for example spring steel, arranged side by side and secured by their upper ends to a rigid support. The surfaces of the tongues engageable with the bricks have a covering of resilient material. The gripper plates 27, 28 and 29, 30 are connected with levers 31 which in their turn are connected by means of levers 32 with said tubes 33 and 34 movable in axial direction. The tubes 33 and 34 are slidable on bolts 35 and 36 respectively which are rigidly secured to a supporting bracket 41 of the gripper frame. The levers 31 carrying the movable gripper plates are pivotally mounted at 4 on said supporting bracket, whereas the spreadable gripper plates 25, 26 are articulated with said axes 108 also arranged on the supporting bracket 41. The said bolts 35 and 36 are connected respectively by ball joints 114 to rods 43 and 44. These rods 43 and 44 are slidable in a vertical direction within the aforementioned tubes 33 and 34 and are slidable in upper bearings 45, 46. The rod 43 serves moreover for the operation of a limit switch 47 (FIG. 3) during the upward movement of the gripper arrangement. The gripper arrangement is suspended as a whole by means of a tube 48 the lower part of which is rigidly connected with the yoke 42. This tube is slidable in the vertical direction in a sliding bearing 49. A wire rope 50 passing over a roller 51 and operated by a winch drum 52 is connected to the upper end of the tube 48. The drum 52 is driven through a gearing by reversible motors 53 and 77 both for the upward and downward movement of the gripper arrangement.

When the wire rope 50 is moved upwards then the tubes 33 and 34 which are fastened to the yoke 42 and tube 48 slide upwards on the bolts 35 and 36, whereas the supporting bracket 41 remains stationary unless it is engaged by pawls 37. These pawls are formed by the ends of levers 57 each of which is pivotally mounted at 76 so as to be capable of swinging movement. During the downward movement of the gripper to the conveyor belt each pawl catches in two slots 58 and 59 arranged approximately at the same height in the tubes 33 and 34 and in the bolts 35 and 36. The levers 57 act together with bolts 60 fitted to weighted levers 38 and which strike against the levers 57 when the gripper descends towards the conveyor belt 11. During the downward movement of the gripper these weighted levers 38 are at first taken along with the levers 57. During this movement the weights 61 fitted to the lever are lifted because of the fact that the weight of the supporting bracket 41 with the gripper plates is suspended on the pawl 37 by means of the bolts 35 and 36. This weight retains therefore the pawl by means of friction so that the load of the weight 61 on the lever arm 38 is not in the position to withdraw the pawl 37 from the corresponding slots 58 and 59 of the tubes 33 and 34.

The downward movement towards the conveyor belt is stopped when the gripper contacts the belt 11 itself. Supporting frames 116 are arranged in order to avoid damage of the resilient gripper plates when the gripper has descended onto the conveyor belt. These supporting frames 116 are secured to the supporting bracket 41 and may simultaneously act as guiding means for the wedge 106 and their legs 109.

Figure 5:
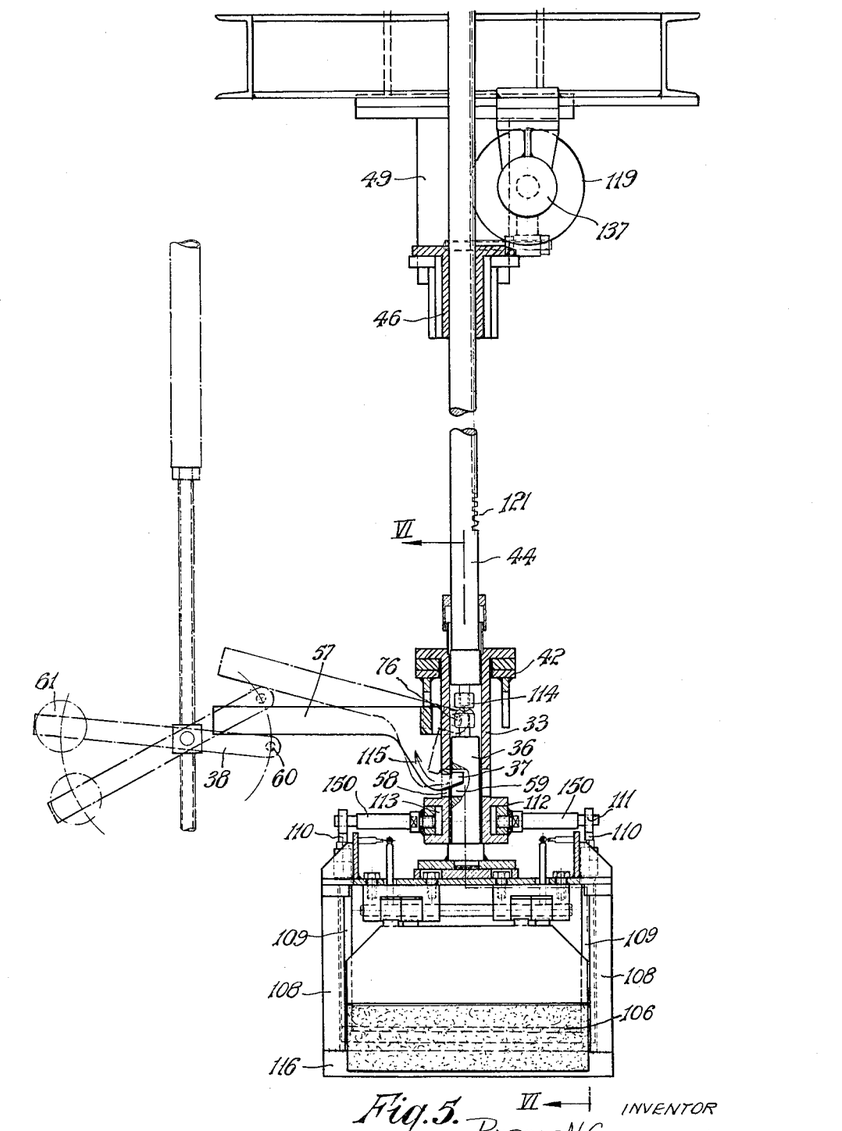
FIGURE 5 is a sectional view on the line VII—VII of FIGURE 4.

Only when the gripper with its supporting frames 116 reaches the conveyor belt 11 then the pawls 37 are disengaged and consequently can be moved in the direction of arrow 115 by the weights 61 out of the slots 58 and 59 into the position as indicated in dotted lines in FIG. 5. During the first part of the upward movement of the gripper from the conveyor belt 11 the supporting bracket 41 together with the gripper plates on it will not follow the upward movement of the gripper yoke 42 and the tubes 33 and 34, so that the wedges 106 which are fastened to the yoke 42 will enter the slots 107 and levers 32 will be pivoted about their joints 4. Thus, the gripper plates are moved into positive gripping engagement with the mouldings on the conveyor belt. After having seized the mouldings the gripper plates are locked by the mouldings and thus prevent the further sliding of tubes 33, 34 on the bolts 35 and 36, so that the supporting bracket 41 is now carried along with tube 48 and yoke 42.

Bolts 140, 141 are fastened to the supporting bracket 41 the upper ends of the bolts projecting through yoke 42, adjustable nuts 142, 143 being provided at their upper ends. The nuts 142, 143 act as stops to limit the sliding movement of tubes 33, 34 on bolts 36, i.e. in case the gripper plates should not be locked by contact with the mouldings after withdrawal of pawls 37 from slots 58.

The gripper arrangement 19 and its drive is supported by a carriage 54 movable on rails 56 on a bridge 55 arranged transversely to the conveyor belt 11.

Figure 7:
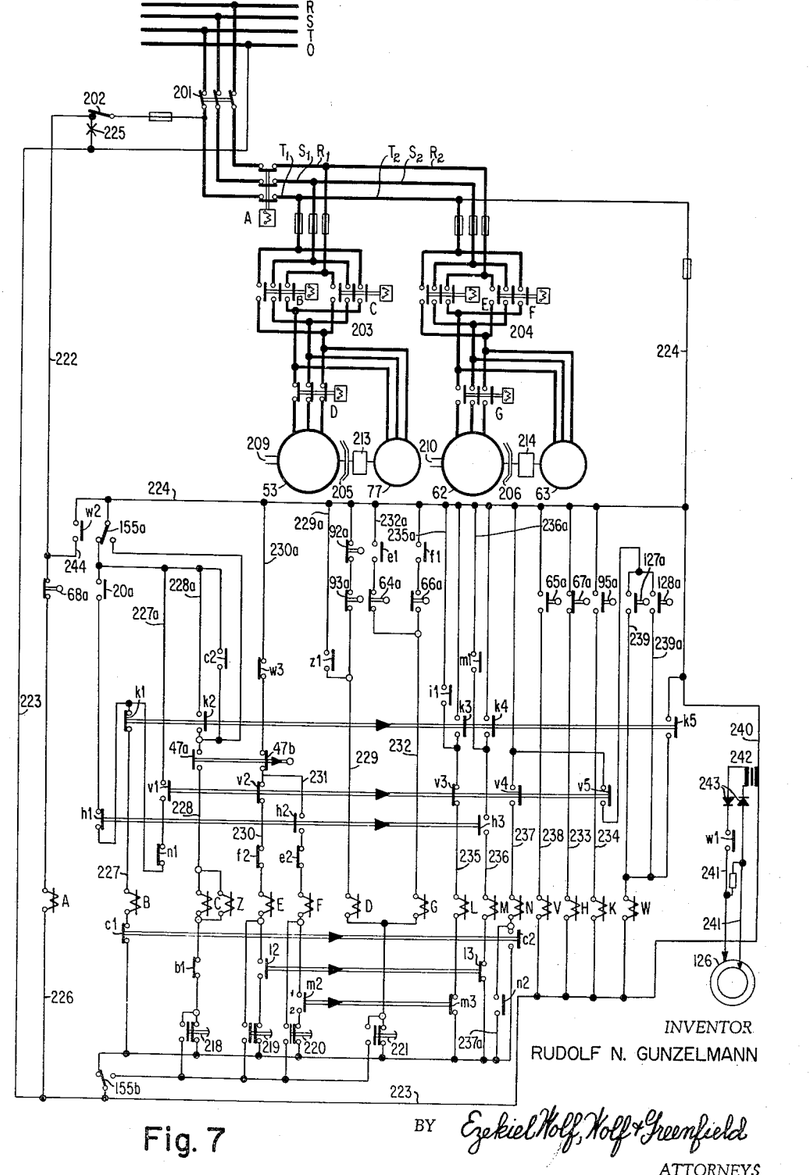
FIGURE 7 is a schematic diagram of an electrical control system for effecting automatically in timed sequence the complete operations of the apparatus from forming the bricks to stacking.
Figure 8:
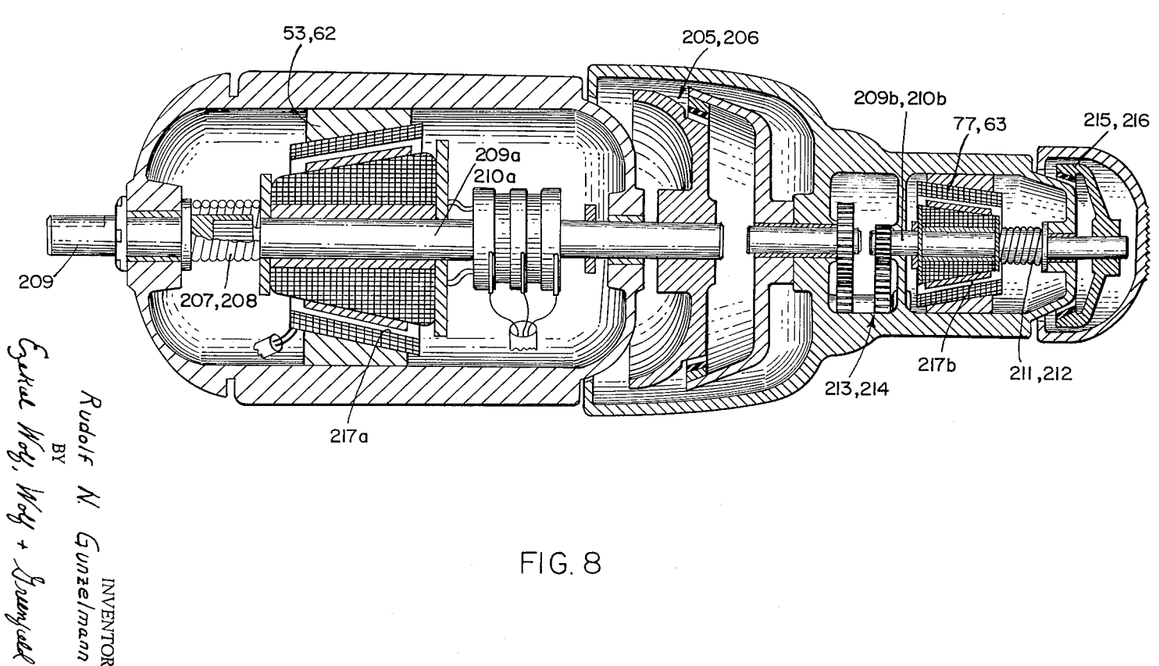
FIGURE 8 is a sectional view of motors for driving the gripper arrangement.

In the following description of the movements of the equipment only the electric switches for controlling these movements and their contacts to be seen in the circuit diagram of FIG. 7 are regarded, whereas the function of the electric operation more broadly is discussed below upon the occasion of the description of the circuit diagram of FIG. 7.

For the traversing movement of the carriage 54 two motors 62 and 63 are provided, one of these motors to serve for normal speed and the other for a reduced speed. For the upward and downward movement two motors 53 and 77 are provided, motor 53 for normal speed and motor 77 for reduced speed. Couple devices 205, 206 usually are switched in by springs 207, 208 as may be seen in FIG. 10. These springs act upon shiftable shafts 209a, 210a for driving the drum 52 for the lifting rope 50 and the spindle 103 for driving the carriage 54. Also, motors 77 and 63 have shiftable motor shafts 209b and 210b and springs 211, 212 for shifting the motor shafts 209b and 210b. In the rest position motor shafts 209a and 209b or 210a and 210b are connected with one another by gears 213, 214 and the clutch 205, 206, and motor shafts 209b and 210b are connected to a brake 215, 216. The motors 53, 62 and 77, 63 are built in such a manner that they have conical air gaps 217a and 217b between their rotors and stators and when switched on their rotors with the motor shafts are shifted by electromagnetic force overcoming the forces of springs 207 and 212.

In the rest position, that is, when the motor lines are disconnected motor shafts 209a or 210b with its rotor is shifted by spring 207 and 208 to its right position and clutch 205 or 206 is coupled, whereas motor shafts 209b or 210b with its rotor by spring 211 or 212 is shifted to its left position and brake 215 or 216 is thrown in. In the removal of the loaded carriage from the conveyor belt 11 to the hardening truck 18, the motor 62 for normal speed is disconnected by means of a limit switch 64 with contacts 64a (FIG. 7) and at the same time the shaft 210b of motor 63 for the reduced speed is connected through reduction gear 214 and clutch 206 to shafts 210a and 210. For the movement of the carriage from the hardening truck 18 to the conveyor belt 11 the same function is performed by the limit switch 66 with contacts 66a (FIG. 7). Limit switch 68 with contact 68a is provided as an emergency switch should either switch 65 or 67 fail to act correctly. During the movement of the carriage to the hardening truck 18 the motor 63 for the reduced speed is mechanically disconnected from the shaft 210a by opening clutch 206 by means of limit switch 65 with contacts 65a, and during movement of the carriage to the conveyor belt 11 this motor is disconnected by means of the limit switch 67 with contact 67a. For the operation of the limit switches these switches are provided with rollers 68a. These rollers act together with trigger cams 22 and 69 which are arranged in such a manner that they carry out the switching operation when the carriage is in the desired position.

A single switching cam 69 is provided for the operation of the switches 66 and 67 for the termination of the movement of the carriage in the direction of the conveyor belt. This switching cam 69 is mounted in an adjustable manner on the bridge. A group of switching cams 22 serves for the termination of the movement of the carriage in relation to the platform wagon 18. These switching cams are arranged on the periphery of a roller 21. By rotating the roller the switching cams 22 can be brought one at a time into the path of the rollers 68a of the switches 64 and 65.

By means of a ratchet device 70 the roller 21 is rotated by one tooth each time the carriage 54 returns to its rest position, and thereby the next cam is brought into position in readiness for the next traversing movement of the truck 18. The cams 22 on the roller 21 are arranged as required for the horizontal movement of the gripper in order thereby to obtain the desired form of the stack on the hardening truck 18.

For effecting the stepwise rotation of the roller 21 there is a ratchet wheel 71 on the axle 21a of the said roller. A ratchet 72 engages the ratchet wheel. This ratchet is fitted to a lever 73 rotatable on axle 21a and this lever is moved so far by means of a cam 74 fitted to the carriage 54 and against the stress of a spring 75 so that the drum 21 is turned by a tooth each time carriage 54 returns to its rest position, and the ratchet cam 74 will engage the lever 73 with ratchet 72 and rotate wheel 71 by one tooth. A second ratchet 72a secures the wheel 71 against backward rotation when lever 73, by the pull of spring 75, returns to its rest position as soon as it is disengaged from cam 74 during the next movement of the carriage to the stacking point.

The vertical movement of the gripper is controlled by means of two feelers 78 and 79. Each of these feelers consists of a pin 80 and 81 fitted with feet 82 and 83, respectively. These feet serve for contacting the conveyor belt 11 or the platform of the hardening truck 18 or for contacting the layers of the mouldings already placed on the hardening truck 18. The pins 80 and 81 are slidable in a vertical direction in tubes 85 and 84 rigidly connected with the supporting bracket 41. The pins have adjustable heads 86 and 87. The pin 80 is longer than the pin 81 and the heads 86 and 87 are adjusted in such a manner that when the gripper is making a downward movement the foot 82 of the pin 80 advances the foot 83 of the pin 81 by the thickness of a moulding. The heads 86 and 87 are fitted with rods 88 and 89. The lower ends of these rods act upon operating levers 90 and 91 of limit switches 92 and 93 having contacts 92a and 93a for controlling the motor 53. The electric connections are made in such a manner that by operating the switch 92 or 93 the motor 53 for normal speed for the downward movement is disconnected and in place of this motor the motor 77 for reduced speed for the downward movement is mechanically connected to shaft 209. An arrangement 94 for sensing a load on motor 77 is provided.

This arrangement is operated as soon as the downward movement of the bracket 41 of the gripper is stopped. For this reason it is operated by the wire rope 50. The motor 77 is disconnected and reversed by this arrangement as soon as the wire rope 50 is discharged from load, for instance when the gripper rests upon the conveyor belt or is otherwise stopped. A switch 95 with contact 95a (see FIG. 7) is actuated as soon as the lever 96 is moved in the direction of the arrow 96a. This lever is pivotally mounted on an axle 97 and carries a roller 51 over which the wire rope 50 extends. This roller is located at one end of the lever 96 on the side of fulcrum 97 opposite switch 95. A support 98 carries that end of the lever 96 when the rope 50 is under strain.

An adjustable tie rod with a spring 100 is connected with the other end of lever 96. The lever 96 is movable in the direction of the arrow 96a by means of the spring 100 and the switch 95 is operated as soon as the strain effected on the rope is reduced; for example, when the gripper rests upon the conveyor belt. Actuation of the switch 95 reverses the sense of rotation of the motor 77 so that a change from downward movement to upward movement of the gripper results.

As already referred to, completion of the upward movement of the gripper from the conveyor belt 11 is effected through the rod 43 by operation of the limit switch 47, and at the same time the horizontal movement of the carriage 54 toward the hardening truck 18 is started. The electric connections are made in such a manner that when actuating the limit switch 65 for the termination of the horizontal movement of the carriage 54 in direction to the hardening truck 18, the motor 53 for the downward movement of the gripper is started. The speed of the downward movement of the gripper towards the platform of the hardening truck or towards the stack of mouldings on this truck is reduced by the feelers 78 or 79 and the downward movement of the gripper is changed into an upward movement by means of the switch 94.

Figure 2A:
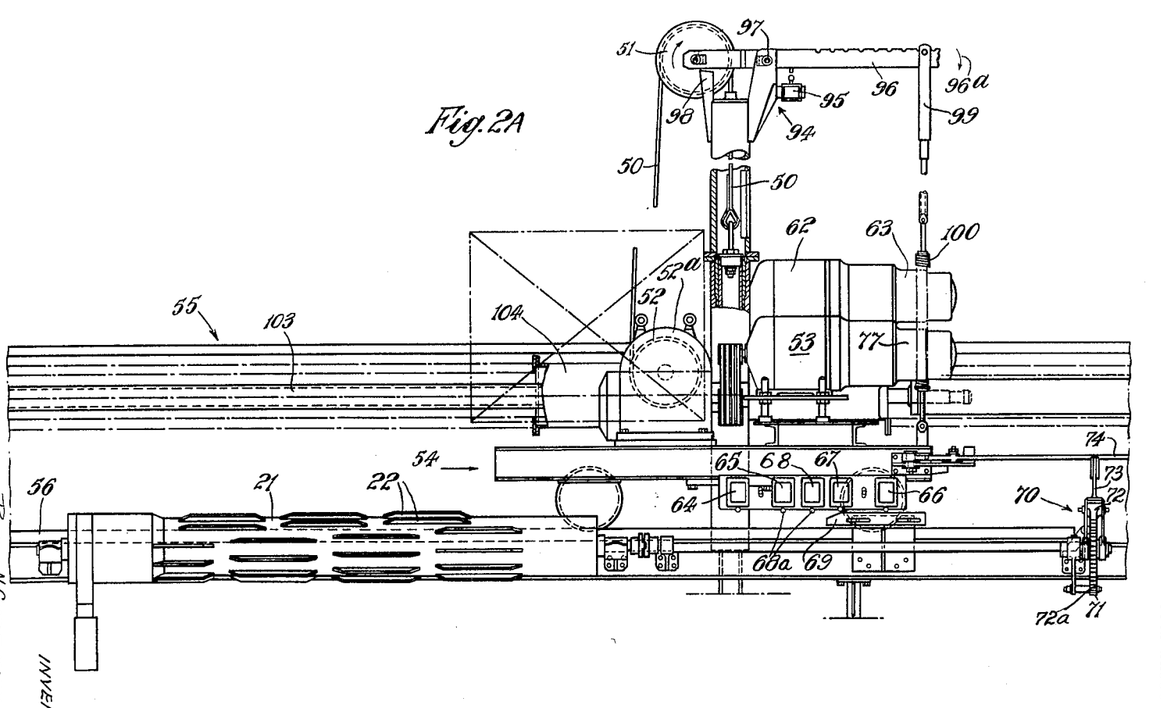
Figure 3A:
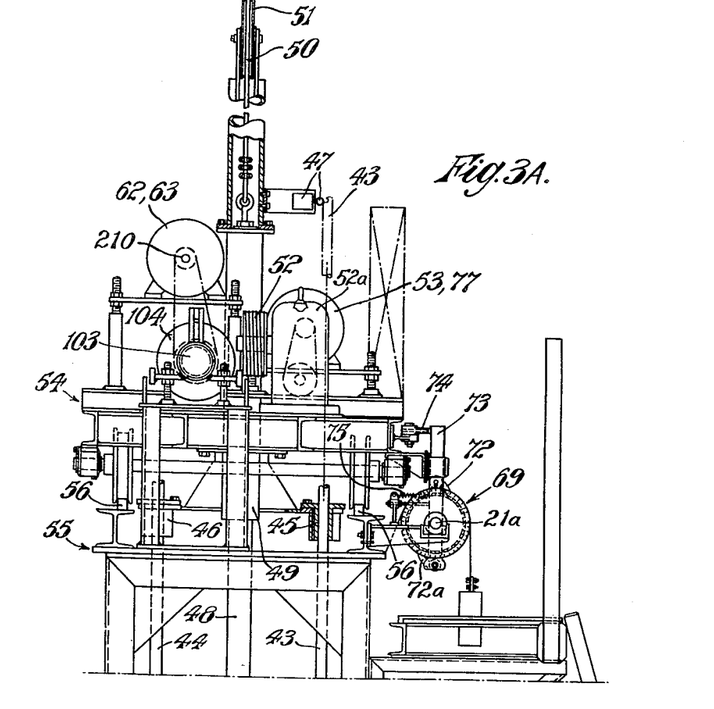
FIGURES 3A and 3B when placed together with the horizontal chain dot lines coinciding show in elevation the mechanism of FIGURES 2A and 2B.
Figure 3B:
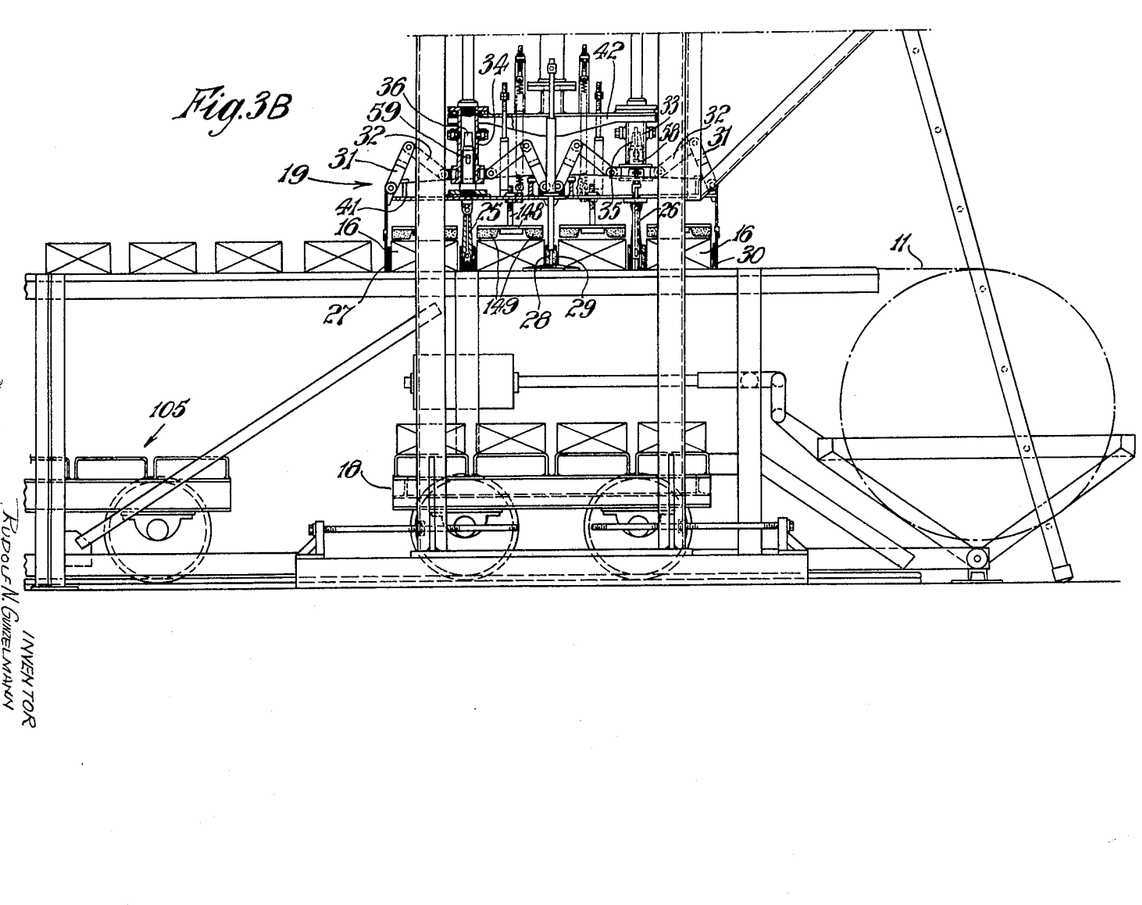

In FIGS. 2 and 3 it will be seen that buffers 148 with rubber cushions 149 are fastened to the bracket 41, said cushions contacting the upper side of the mouldings 16 and thus stopping further downward movement of bracket 41, when the gripper is moved downwards in direction to the mouldings stacked on the hardening truck, because in this case the frame 116 cannot contact either the platform or the mouldings thereon.

Figure 6:
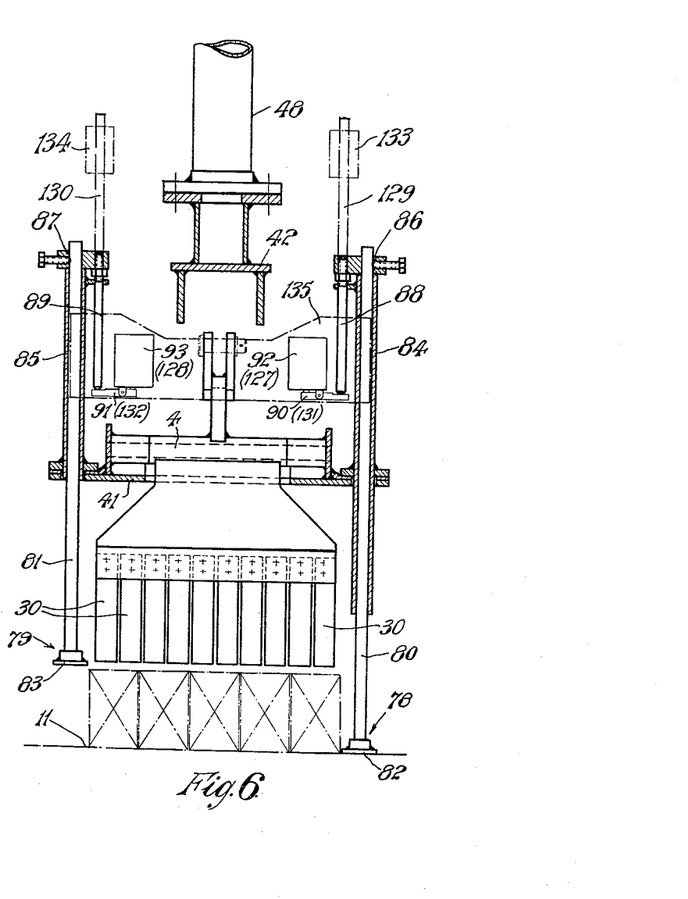
FIGURE 6 is a sectional view on the line VIII—VIII of FIGURE 4.

FIGS. 4, 5 and 6, show an alternative arrangement for controlling the downward movement of the gripper toward the truck or a stack of mouldings on the truck. In this arrangement the downward movement is not interrupted as a result of contact between the gripper and platform or mouldings on the platform as described above, but is effected by operation of a braking device which is operable in such a manner that the gripper movement is stopped before contacting the platform or the mouldings on it. This has the advantage that possible damage to the stacked mouldings is prevented.

For this purpose a braking device 117 is provided, to which rods 43 and 44 of the gripper are connected through a free wheeling device 138 located adjacent the bearing 49. The rods 43 and 44 are connected to the device 138 by gear wheels 119 fixed on a shaft 120 rotatably mounted in bearings 136, 137, the gear wheel teeth being in constant engagement with rack teeth 121 provided on each said rod 43 and 44.

The braking device 117 consists of two main parts 122, 123 coaxially arranged on shaft 120, part 122 being fixed on the shaft whereas part 123 is mounted rotatably on shaft 120 and fixed non-rotatably in space by an arm 124 extending to bolt 118. Parts 122 and 123 are interconnected by a disc clutch 125 which is actuated by an electromagnet 126. Switches 127, 128 are provided for actuating electromagnet 126 as soon as feeler 82 or 83 has reached a predetermined limit of travel which is determined by a further downward movement of the gripper equivalent to the thickness of not quite one moulding. Upon upward movement of the gripper head 86 or 87 of pin 80 or 81 will lift a pin 129 or 130 out of contact with switch operating lever 131 or 132 of switch 127 or 128. For this purpose pins 80 and 81 are provided with longitudinally adjustable buffers 133 and 134 respectively. Switches 92, 93 and 127, 128 are mounted to a wall 135 which is carried by the supporting bracket 41.

After actuating electromagnet 126, the downward movement of rods 43 and 44 and supporting bracket 41 is stopped at, for instance one or two millimeters distance between the mouldings within the gripper and the platform of the hardening truck or the mouldings already stacked on this platform in the foregoing working periods of the stacking device. Then on further downward movement of the tube 48 and yoke 42, tubes 33 and 34 will slide down on bolts 35 and 36 and wedges 106 will disengage from slots 107 so that gripper plates 25 and 26 are withdrawn by springs 139. Simultaneously levers 32 and 31 and gripper plates 27 to 30 are operated so that the mouldings are released by the gripper and drop said one or two millimeters onto the platform or onto mouldings previously stacked on the platform. Also the pawls 37 engage the slots 58 of tubes 33 and 34 again, switch 94 is operated to reverse motor 77 to cause upward movement of the gripper arrangement. The carriage 54 is driven by motors 62, 63 by means of travelling nut 104 and by means of a rotatable feed spindle 103 rigidly fixed in the bridge.

In FIG. 7 is shown the circuit diagram for electrical operation of the above described stacking equipment. The following is a description of the electric arrangement and of the mode of operation of the complete apparatus. For simplicity the motors 53, 77 and 62, 63 with their current lines with main switch 201 and contactors A, B, C, D, E, F and G are shown in the upper part of FIG. 7 and the controlling circuits for actuating said contactors are shown in the lower part of that figure.

From the automatically operating brick press 9 mouldings 16 are shifted in the sequence of operation of the press onto the conveyor belt 11. This is effected by the slider 14 operated by the pressing mechanism. The conveyor belt 11 is moved on in a stepwise manner by the driving mechanism 23 so that in accordance with the sequence of operation of the press the mouldings are placed in a line so that the mouldings have the same distance from one another. The distance of the mouldings 16 on the conveyor belt is so adjusted that the gripper plates 25 to 30 can enter into the intermediate space between the mouldings whereby a sufficient clearance is left so that the mouldings cannot be damaged when the gripping plates are moved into or out of the gripping position.

The advance of the conveyor belt in synchronism with the operation of the press is thus of decisive importance for a correct mode of operation of the stacking equipment arranged at the end of the conveyor belt. The function would be different if only one moulding at a time had to be gripped and placed on the truck by the stacking equipment. Such a mode of operation would, however, be unsuitable because the stacking equipment would have to operate in this case in the same sequence of operation as the brick making press. In such a case the stacking equipment would have to make such rapid movements that the mouldings would be subject to the danger of rupture owing to the accumulating accelerative forces and it would not be possible to obtain exact operation positions of the gripper. Owing to the simultaneous movement of four mouldings or a whole line of mouldings at a time corresponding to the length of the truck, a lower speed for operation of the stacking equipment can be used and this permits smooth operation of the grippers so that extremely delicate mouldings can be handled and placed on the truck.

Because of the fact that at the stacking of mouldings the lower layers of mouldings are subject to the load effected by the weight of the upper layers, it is advantageous to expose the mouldings before stacking to a prehardening process. This is effected by passing the conveyor belt 11 with the mouldings 16 through the prehardening chamber 17, as suggested above.

The main circuit connection of the automatic control of the stacking equipment takes place by means of a three-pole main switch 201 which is connected to the conductor lines R, S, T of a three-phase four wire system R, S, T, O with O the neutral conductor, and is installed at the fixed part of the bridge construction 55, a flexible cable being connected between the switch and the travelling crab or carriage 54. At the press 9 near said switch 68a a control lamp 225 is provided. As soon as the main switch is closed, a master contactor A receives voltage from phase T through a connection line 222 and emergency circuit breaker 202 which is arranged at the press 9, a contact 68a of the abovementioned energy limit switch 68 for the horizontal movement, and a connection line 223, to neutral conductor O of the three-phase system. Therefore, after main switch 201 is closed the master contactor A is actuated and by its contacts gives voltage from the three lines over main switch 201 to supply lines $R_1$, $S_1$, $T_1$ and $R_2$, $S_2$, $T_2$ of motors 53 and 57 for lifting and motors 62 and 63 for horizontal movement, respectively.

The motor supply lines $R_1$, $S_1$, $T_1$, and $R_2$, $S_2$, and $T_2$ pass through contacts of contactors B, C, D and E, F, G respectively which are controlled correspondingly. The change of the direction of rotation of the motors 53, 77 and 62, 63 is effected by the two contactors B and C, and E and F respectively, viz. by interchanging the two supply lines $R_1$, $S_1$ and $R_2$, $S_2$ as shown at 203 and 204.

The two correlating contactors B, C and D, F are interlocked against one another in order to prevent both directions of rotation from being switched in simultaneously, by contact $c_1$ of contactor C and $b_1$ of contactor B as contact $c_1$ of contactor C breaks the circuit of contactor B and contactor $b_1$ breaks the circuit of contactor C and by contactor $e_2$ of contactor E and contact $f_2$ of contactor F.

The drive for vertical movement with motors 53 and 77 is switched on by contactor B for lowering and by contactor C for lifting; the horizontal movement with motors 53 and 77 to the point where the bricks are stacked is initiated by contactor E and the horizontal movement with motors 62 and 63 to the point where the green bricks are seized is initiated by contactor F. Contactors D and G serve for the speed control of the driving motors concerned; if these contactors are switched on, the high-speed motors 53 and 62 receive voltage, the low-speed motors 77 and 63 are decoupled by devices 205 and 206, and a high-speed is obtained. The low-speed motors 77 and 63 receive voltage also, but as they are decoupled, they run idle.

When the motor supply lines $R_1$, $S_1$ and $T_1$ are connected by actuating for an instance the contactors B and T, motor shaft 209a is shifted to its lift position and clutch 213 is uncoupled against the force of the spring 207 so that shaft 209 is driven by motor 53 alone with high speed. Motor shaft 209b is shifted to its right position and brake 215 is released against the force of spring 211 so that motor 77 will run idle because clutch 205 is uncoupled.

When the motor supply lines $R_1$, $S_1$ and $T_1$ are connected by actuating contactor B alone, motor shaft 209b is shifted to its right position, brake 215 is released, and thus motor 77 drives shaft 209 over change speed gear 213, clutch 205 and motor shaft 209a, with slow speed. In the same manner motors 62 and 63 may be actuated by contactors E, F and G for driving the shaft 210 and spindle 103 for moving the carriage 54 with fast or slow speed to and fro.

The actuators B, C, D and E, F, G for the driving motors are controlled by a series of switches according to the sequence of the cycle of operations. The whole operation consists of the following six action cycles:

(1) Lowering of grippers 19 above the point where the green bricks 16 are seized.
(2) Lifting grippers above the point where the green bricks are seized.
(3) Horizontal transport of grippers to the point where the green bricks are stacked.
(4) Lowering grippers above the point where the green bricks are stacked.
(5) Lifting grippers above the stacking point, and
(6) Returning grippers to the point where the green bricks are seized.

The wiring for performing the above six action cycles can be seen in the circuit diagram FIG. 7. In this diagram the position of contacts corresponds to the position of the crab or carriage 54 above the conveyor 11 in readiness to grip.

Between connection lines 222 and 223 is arranged a current path 226 for contactor A and between connection lines 224 and 223 are arranged parallel current lines 227—232 for contactors B, C, D, E, F and G for controlling the motors and current lines 233—240 for relays H, K, L, M, N, V and W for controlling the current lines of said contactors and for the electromagnet 126. Said contactors and relays are actuated by switching contacts of the above-mentioned switches which are controlled by mechanical movement of and depending on the position of certain corresponding parts of the equipment as described above. Contacts of these switches are shown in FIG. 7 by the same numbers as their switch unit and are given different characters. Thus, the contact of limit switch 67 in line 233 is identified by numeral 67a whereas contacts of actuators in relays are shown by corresponding lower case letters and different numbers. Thus, the contacts of relay H are identified by $h_1$, $h_2$, etc. The parts identified by numerals 155a and 155b are contacts of a change over switch from automatic starting to manual starting of the stacking equipment which is performed by hand operated switches 218, 219, 220 and 221. Change over switches 155a and 155b in the drawing are shown in position for automatic motor control.

Following is a description of the entire control system.

Switching before starting the cycle of operations: The gripper is in its upper position above the conveyor belt when it is in its rest position, as shown in FIG. 1. In the rest position of the gripper the pairs of gripper plates are held in open position by means of the pawls 37, and the wedge 106 is disengaged from the slot 107. By closing the three-pole main switch 201 at the bridge, connection lines 222 and 224 of the control circuit receive voltage and contactors A, D and auxiliary relay H switch on. Current path 226 of contactor A is closed over contact 68a of limit switch 68, current line 229 for contactor D over contacts 92a and 93a of feeder switches 92, 93, and current line 233 of relay H over contact 67a of limit switch 67. The circuit is now ready to receive the first pulse.

As soon as the first moulding or green brick 16 in direction of the advance movement of the conveyor belt 11 gets near the mechanical feeler 20 (FIG. 1) or near an optical feeler 102 (FIG. 2) the stacking equipment is started. The optical feeler or light feeler can be of any known variety. It may consist of a lamp 101 and of a light receiver 102. The light beam is interrupted by the first moulding 16 and starts the operation of the stacking equipment.

(1) *Lowering at seizing point.*—The contactor B for lowering is switched in by the green bricks 16 arriving on the conveyor and operating the contacts 20a of feeler 20. Circuit of contactor B for lowering is closed from phase T over the corresponding T-phase contacts of main switch 201 and contactor A, connection line 224, switch contact 155a, contact 20a, contact $h_1$ of attracted auxiliary H, rest contact $k_1$ of auxiliary relay K, rest contact $c_1$ of contact C, contact 155b and connection line 223 to neutral conductor line O of the three-phase system R, S, T, O.

Both the small and the large lifting motors 53 and 77 receive voltage through contactor D for lowering as contactor D is already closed. The large motor 53 releases the shaft of the small motor 77 thus effecting a quicker lowering movement, until by operation of contacts 92a or 93a of change-over switches 92 or 93 by feeler 78 or 79, large motor 53 is disconnected, and the lowering movement is continued slowly by the small motor 77 through a coupling 205 and a reduction gear 213.

During the downward movement of the gripper the levers 57 contact the stop bolts 60 and this effects a lifting of the weight 61 until the frames 116 of the gripper 19 contact the conveyor belt 11. At this time the pawls 57 are disengaged by the weight 61 so that the tubes 33 and 34 with the yoke 42 are released. Upon release of the strain on the rope 50 the switch 94 is simultaneously actuated and the sense of rotation of the motor 77 is reversed whereby the change from the downward movement to the upward movement is effected. By closing contact 95a in line 234 the current pulse of switch 95 causes the auxiliary relay J to attract. By opening contacts $k_1$ of relay K the contactor B for lowering releases, whereas contactors C for lifting is actuated through contact $k_2$ of K, as lifting contact 47a of limit switch 47 in line 228 has already been closed immediately upon the beginning of the lowering movement. Furthermore, auxiliary relay K prepares the traveling movement through its contacts $k_3$ and $k_4$; contact $k_3$ causes auxiliary relay L to attract which latter relay holds this position by means of its own retaining contacts $L_1$ in a shunt line 235a to contact $k_3$, and prepares the transport to stacking point by its contacts $l_2$ in line 230 for contactor E.

(2) *Lifting.*—When the gripper is raised the tubes 33 and 34 and the wedge 106 are also raised whereas the gripper plates initially remain on the conveyor belt. This results in the plates 25 and 26 being spread by engagement of the slot 107 by the wedge 106 and also as a result of displacement of tubes 33 and 34 on the bolts 35 and 36. By means of the levers 31 and 32 the horizontal closing operation of the gripper plates 27—30 is effected so that the mouldings 16 are seized by the pairs of gripper plates. As soon as this horizontal movement of the gripper plates is complete and as soon as the mouldings 16 are held, a rigid coupling is made between the tubes 33, 34, the yoke 42 and the supporting bracket 41, and the gripper makes an upward movement together with the mouldings. The pawls 57 cannot now enter into the slots 58 of the tubes 33, 34 and remain outside of the tubes above the slots 58. This prevents engagement of the pawls when the gripper is moving upwards.

Contactor C for lifting remains connected through its own retaining contacts $c_2$ within a shunt line 228a to current path 228 of contactor C. The gripper however, only lifts slowly in the beginning, as one of the tactile switches 92 or 93 with contacts 92a or 93a in line 229 of contact D can only switch in the large motor 53 through contactor D if a certain height above the conveyor is reached. In order to save operating time, however, time-limit relay R which is connected parallel to contactor C for lifting makes sure that the contactor D is attracted through the relay contacts $z_1$, in the shunt line 229a to contacts 92a and 93a, thus switching on the quick-acting driving motor at an earlier stage than the switches 92 and 93 would do. As soon as the gripper reaches its top dead centre the lifting limit switch 47 is actuated by rod 43 which releases contactor C for lifting through its contacts 47a, thus terminating the lifting operation.

(3) *Transport to stacking point.*—The contact 47b of limit switch 47 for lifting also closes the last opened connection for contactor E which renders possible the travelling movement of carriage 54 to the stacking point. Contactor E for transport attracts through auxiliary contact $e_1$ in a shunt line 232a to contacts $f_1$ and 66a in current line 232 and the contactor G for quick transport is connected also so that both driving motors 62 and 63 are now in circuit. As in the case of lifting, the large motor 62 now disconnects from the shaft 210b of the small motor 63 and the propelling mechanism is set into motion at a higher speed.

The contact 67a of the travelling limit switch 67 now opens and causes the auxiliary relay H to release. This can be regarded as preparation for the cycle of operations which follows later; contact $h_1$ of contactor H opens to preserve the order of operations in the sequence by connecting at random conveyor switch 20 and contact 20a in line 227. The closing of contacts $h_1$ and $h_3$ of contactor H serves for the subsequent return movement.

The drum controller 21 releases first contacts 64a of change-over switch 64 by means of a corresponding cam 22, whereby contactor G releases thus interrupting the voltage to the large transport motor 62. Now the small motor 63 slowly continues the transport movement through gear 214 and coupling 206 until travelling limit switch 65 is switched in by a cam 22 of the cam drum 21. Its contact 65a in line 238 causes auxiliary relay V to attract. Horizontal travelling movement is terminated by this relay;

(1) by releasing contacts $v_2$ in line 230 of contactor E;

(2) by releasing contact $v_3$ in line 235 which disconnect auxiliary relay $L_1$ and prepares contraction of relay M by contact $L_3$;

(3) by closing contact $v_1$ in the shunt line 227a to contact 20a and $h_1$ in line 227 whereby the auxiliary relay V initiates again the lowering movement; moreover, by actuating contactor B. The current path of contactor B in this case is completed over shunt line 227a with its closed contacts $v_1$ and $n_1$ and the middle part of line 227 with closed contacts $k_1$ and $c_1$. Contact $n_1$ is closed by auxiliary relay N actuated over contact $v_4$ of actuator relay V and retained by its own contact $v_2$ in shunt line 237a to contact $c_2$. Rest contact $k_1$ is closed because its relay K is released by contact 97a in line 234. Rest contact $c_1$ is closed because line 228 of contactor C is interrupted by open rest contact $k_2$ of relay K. Moreover, through closed contact $v_4$ in line 237 the auxiliary relay N is prepared to attract for the next action cycle.

Furthermore the connection of relay W is prepared to operate electromagnet 126 of braking device 117 and to catch the gripper by closing contact $v_5$.

(4) *Lowering at stacking point.*—Contactor B for lowering the gripper has attracted through contact $v_1$ of auxiliary relay V and through rest contacts $n_1$ of auxiliary relay N, through rest contact $k_1$ of auxiliary relay K and rest contact $c_1$ of contactor C. The lowering operation proceeds in a similar manner to that effected over the conveyor where the green bricks are seized. The only difference is that after the actuation of the change-over 92 or 93 with contacts 92a or 93a in line 229 by feeler 78 or 79 which converts from rapid lowering speed to slow speed, switch 127 with contact 127a in line 239 or switch 128 with contact 128a in shunt line 239a to contact 127a in line 239 is actuated shortly before the gripper with the green bricks reaches the stacking position of the truck or of the stack of green bricks thereon, thus the relay W is actuated and the electromagnet 126 is switched on over line 240, transformer 242 and line 241 by contact $w_1$ and retains the gripper by braking device 117. Thus when the grippers open the green bricks fall a short distance of about 1 mm. out of the gripping jaws and as the gripper arrangement is supported it does not rest on the stack of green bricks. The braking device 117 with electromagnet 126 can only be operated when the gripper is over the stacking point, as it is only when the gripper is in this position that the auxiliary relay V is energized so that the control current is supplied to relay W through its contact $v_5$ and the contacts 127a or 128a of switch 127 or 128. The brake coupling is operated through a rectifier 243 by 24 volts D.C. current in line 241.

During lowering it will be appreciated that the auxiliary relay V is switched in and not relay H as previously. Therefore, rest contact $h_3$ in line 236 is closed. As soon as the gripper touches the ground or is held by the brake coupling, respectively, and the rope control 95 operates auxiliary relay K, the contact $k_4$ of the latter give only short contacts and thereby operate relay M which prepares the following transport movement. Relay M remains connected through its own retaining contacts $m_1$ in shunt line 36a to contact $k_4$ in line 236. The changing-over from lowering to lifting movement at the stacking point is effected in the same manner as at the point of gripping through switch 95, contact 95a in line 234 of relay K. As soon as the contactor C for lifting has been switched in through contact $k_2$ of auxiliary relay K, auxiliary relay N attracts, too through retaining contact $c_3$ of the contactor C for lifting; thus a new lowering is prevented on terminating the lifting movement.

(5) *Raising gripper at stacking point.*—Gripper raising is effected in the same manner as described under head 2. The contactor C for raising is disconnected by means of contact 47a of the lifting limit switch 47.

(6) *Return traverse of gripper to the position of gripping.*—The contact 47b of lifting limit switch 47 closes the circuit simultaneously for contactor F in line 230 for horizontal movement of the gripper, as contact $h_2$ of auxiliary relay H in line 231, contact $e_2$ of contactor E for horizontal movement and $m_2$ of actuated auxiliary relay M are closed. The carriage 54 would start moving at slow speed now if it were not for the contactor G for higher speed which is switched in through auxiliary contact $f_1$ of contactor F.

The horizontal traversing movement is started by connecting the motor 62. The electric connections are made in such manner that the horizontal movement is now made in an opposite direction and that the gripper returns to the brick take-up position. This rest position is obtained after contact 66a of the limit switch 66 has at first disconnected contactor G and reduced the speed of the horizontal movement by means of the switching cam 69 and after this movement has been stopped by interruption of contact 67a of the limit switch 67 thus completing line 233 of relay H and interrupting line 231 of contactor F by contact $h_2$ by means of limit switch 66 and connections are changed from motor 62 to motor 63 and by means of the limit switch 67 the motor 63 is stopped.

The stacking equipment and its controlling circuit is now ready for the next working cycle which is started by the mechanical feeler 20 or by the optic electric feeler 101, 102. The truck 18 with the stacked mouldings is then driven into the hardening tank 9 and the next truck 105 is then driven below the stacking equipment so that there is no interruption in the working process.

As a protective means against damage caused by breakage of rope, the movement of the rope sheeve subsequent to such a breakage or the slackness of the rope actuates switch 95, as a result of which auxiliary relay K is brought into circuit by contact 95 in line 234. Through the contact $k_5$ of relay K the auxiliary relay W is operated which, on its part, over the contacts $w_1$ in line 241 and contact $w_2$ in a connection line 244 between lines 222 and 224 switches in the electromagnet 126 of brake coupling 117. As a further protection means against damage caused by breakage of rope during the transport movement relay W has contacts $w_3$ in the common part 230a of lines 230, 231 by which contactors E and F for the transport movement is interrupted.

What is claimed is:

1. A conveying device comprising a frame, a plurality of pairs of grippers extending downwardly from the frame, lifting means for raising and lowering the frame, drive means for operating the lifting means at a plurality of speeds, means responsive to the raising of the frame causing the pairs of grippers to grasp objects between them, feelers disposed below the grippers and separated vertically a distance equal to the height of the object to be grasped by the grippers, and means responsive to the upper of the feelers engaging the top of the object or the lower feeler touching the support of the object for causing the drive means to operate the lifting means at a reduced speed.

2. A conveying device comprising a frame, a plurality of pairs of grippers extending downwardly from the frame, a movable carriage disposed above the frame, a lever pivotally mounted intermediate its ends on the carriage, a pulley secured to one end of the lever, a cable secured at one end to the frame and extending over the pulley, a winch secured to the other end of the cable for raising and lowering the frame, means responsive to the upward movement of the frame for moving the grippers closer together, first and second motors for driving the winch, the first of said motors driving the winch at a greater speed than the other motor, means responsive to the grippers reaching the proximity of the object to be grasped by the grippers for causing said other of the motors to drive the winch, biasing means for pivoting the lever on the carriage for raising the pulley, the load of the frame overcoming the biasing means, and means responsive to the movement of the pulley under the influence of the biasing means for reversing the direction of rotation of the second motor.

3. A conveying device comprising a frame, gripping members secured to the frame, a cable secured to the frame for raising and lowering the frame, a motor driven winch for operating the cable, means responsive to the raising of the frame for causing the grippers to grasp an object to be conveyed, and means responsive to a no load condition on the cable for reversing the direction of rotation of the winch.

4. A conveying device comprising a frame, a carriage disposed on a track above the frame and supporting the frame, a plurality of grippers secured to the bottom of the frame, a pulley system for raising and lowering the frame to and from the carriage, two motors for operating the pulley system, one of said motors operating the system faster than the second motor, third and fourth motors for driving the carriage on the track, the third motor driving the carriage at a greater speed than the fourth motor, means responsive to the lowering of the frame to the support of objects to be conveyed for causing the second of the motors to drive the pulley system, trip means responsive to a no load condition on the pulley system for reversing the direction of rotation of the second motor, means responsive to the raising of the frame from the support of the objects to be conveyed causing the grippers to close about the objects, means responsive to the frame reaching a predetermined height above the support of the objects for shutting off the first motor and starting the third motor, and additional means responsive to the movement of the carriage a preselected distance along its track for stopping the third motor and starting the fourth motor.

5. A device as defined in claim 4 further characterized by said pulley system including a lever pivotally mounted intermediate its ends on the carriage, a pulley mounted on one end of the lever, a cable secured to the frame and extending over the pulley, biasing means secured to the lever urging it to pivot against the load of the frame, said biasing means being insufficient to overcome the load of the frame, and a switch forming part of the trip means reversing the direction of rotation of the second motor in response to pivotal movement of the lever under the influence of the biasing means.

References Cited in the file of this patent

UNITED STATES PATENTS

| | | |
|---|---|---|
| 1,439,245 | Knapp | Dec. 19, 1922 |
| 1,510,717 | Straight | Oct. 7, 1924 |
| 1,860,143 | Fuller | May 24, 1932 |
| 1,974,891 | Poliakoff | Sept. 25, 1934 |
| 2,364,897 | Grigsby | Dec. 12, 1944 |
| 2,382,194 | Wood | Aug. 14, 1945 |
| 2,388,408 | Harry | Nov. 6, 1945 |